(12) United States Patent
Chaumet et al.

(10) Patent No.: US 7,927,113 B2
(45) Date of Patent: Apr. 19, 2011

(54) PUMPING ASSEMBLY WITH A GROUNDING CONNECTION HAVING SHARP EDGES TO BITE INTO AN INSULATING LAYER OF THE PUMP HOUSING

(75) Inventors: Pascal Chaumet, Hagenau (FR); Detlef Marth, Gerlingen (DE); Erich Jahrstorfer, Forstern (DE); Ingo Immendoerfer, Tamm (DE); Philip De Haan, Germering (DE); Bruno Schoener, Gross-Zimmern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/446,061

(22) PCT Filed: Sep. 20, 2007

(86) PCT No.: PCT/EP2007/059947
§ 371 (c)(1),
(2), (4) Date: Sep. 10, 2010

(87) PCT Pub. No.: WO2008/046709
PCT Pub. Date: Apr. 24, 2008

(65) Prior Publication Data
US 2010/0323552 A1 Dec. 23, 2010

(30) Foreign Application Priority Data
Oct. 17, 2006 (DE) .......................... 10 2006 048 900

(51) Int. Cl.
*H01R 13/648* (2006.01)
(52) U.S. Cl. ...................................................... 439/108
(58) Field of Classification Search ................... 439/108, 439/95, 96, 101, 103, 104
See application file for complete search history.

(56) References Cited

U.S. PATENT DOCUMENTS 4,169,640 A * 10/1979 Lee ................................ 439/104

(Continued)

FOREIGN PATENT DOCUMENTS

DE 3417266 A1 11/1985

(Continued)

*Primary Examiner* — Chandrika Prasad
(74) *Attorney, Agent, or Firm* — Ronald E. Greigg

(57) ABSTRACT

Electric fuel pumps are already known with a pump housing and a ground terminal, which is provided on a terminal cover, for making contact with an electrical ground, in which the pump housing and the ground terminal are connected to one another via a ground connection, which has a first contact section for making contact with the pump housing and a second contact section for making contact with the ground terminal. The first contact section is provided on the outer circumference of a terminal cover and, after installation, is pressed with a contact pressure against the inner face of the pump housing. Since the inner face of the pump housing has increasingly been provided with an electrically insulating anticorrosion coating, however, when the terminal cover is pressed into the pump housing, touching contact with the pump housing does take place which is usually also electrically conductive, but as a result of the electrically insulating coating has a high electrical resistance. In the case of the conveying assembly according to the invention, the impedance of the contact-making is reduced. The invention provides that the first contact section is designed to have sharp edges in such a way that, when it is pushed into the pump housing, it passes locally through an electrically insulating layer formed on the pump housing.

10 Claims, 3 Drawing Sheets

U.S. PATENT DOCUMENTS

| | | | |
|---|---|---|---|
| 4,174,874 A * | 11/1979 | Lee | 439/104 |
| 4,589,715 A * | 5/1986 | Weisenburger | 439/77 |
| 5,035,631 A * | 7/1991 | Piorunneck et al. | 439/108 |
| 5,791,936 A * | 8/1998 | Nicholson | 439/521 |
| 5,965,966 A | 10/1999 | Aiello et al. | |
| 7,425,153 B1 * | 9/2008 | Miller | 439/578 |
| 2003/0107273 A1 | 6/2003 | Ikeda et al. | |
| 2010/0132456 A1 * | 6/2010 | Lee | 73/313 |

FOREIGN PATENT DOCUMENTS

| | | |
|---|---|---|
| DE | 19943959 A1 | 3/2001 |
| GB | 2013042 A | 8/1979 |

* cited by examiner

PUMPING ASSEMBLY WITH A GROUNDING CONNECTION HAVING SHARP EDGES TO BITE INTO AN INSULATING LAYER OF THE PUMP HOUSING

CROSS-REFERENCE TO RELATED APPLICATION

This application is a 35 USC 371 application of PCT/EP 2007/059947 filed on Sep. 20, 2007.

BACKGROUND OF THE INVENTION

1. Field of the Invention

The invention is based on a pumping assembly.

2. Description of the Prior Art

An electric fuel pump is already known from German Utility Model DE 91 12 096 U1, having a pump housing and a ground terminal, provided on a terminal cap, for making contact with an electrical ground, the pump housing and the ground terminal of the terminal cap being connected to one another via a ground connection which has a first contact portion for making contact with the pump housing and a second contact portion for contacting to the ground terminal. The first contact portion is provided on the outer circumference of a terminal cap, and after installation, it is pressed with a contact pressure against the inner face of the pump housing. However, since the inner face of the pump housing is increasingly provided with an electrically insulating anticorrosion coating, when the terminal cap is pressed into the pump housing a touch contact with the pump housing is created that in most cases is also electrically conductive, but because of the electrically insulating coating, it has a high electrical resistance and a high impedance. However, for good electromagnetic compatibility of the pumping assembly, low-resistance or low-impedance contact-making is required.

ADVANTAGES AND SUMMARY OF THE INVENTION

The pumping assembly according to the invention has the advantage over the prior art that in a simple way, low-resistance or low-impedance contact-making is attained in that the first contact portion is in sharp-edged fashion such that upon insertion into the pump housing, it locally penetrates an electrically insulating layer embodied on the pump housing.

It is especially advantageous if the first contact portion protrudes in some portions toward the pump housing, since the first contact portion can in this way act in scratching fashion on the insulating coating.

It is also advantageous if the first contact portion has at least one tab, which is embodied as sharp-edged on at least one edge or corner, since the embodiment according to the invention can in this way be realized especially simply and economically.

In an advantageous feature, the at least one tab, on its edge oriented toward the pump housing, is embodied in toothlike, sawtoothlike, wavelike or similar fashion, since in this way, a plurality of contact points with the pump housing are formed, and very low-impedance ground contact-making is attained.

It is highly advantageous if two tabs are provided, which are oriented parallel or obliquely to one another in such a way that their extensions converge or diverge. In this way, the ground contact maker is elastically resilient, so that reliable contact-making is attained.

It is also advantageous if the ground connection is embodied in sheet-metal fashion, since in this way the production costs for the connection are especially low.

BRIEF DESCRIPTION OF THE DRAWINGS

One exemplary embodiment of the invention is described in further detail in the ensuing description in conjunction with the drawings, in which.

DESCRIPTION OF THE PREFERRED EMBODIMENT

Figure 1:
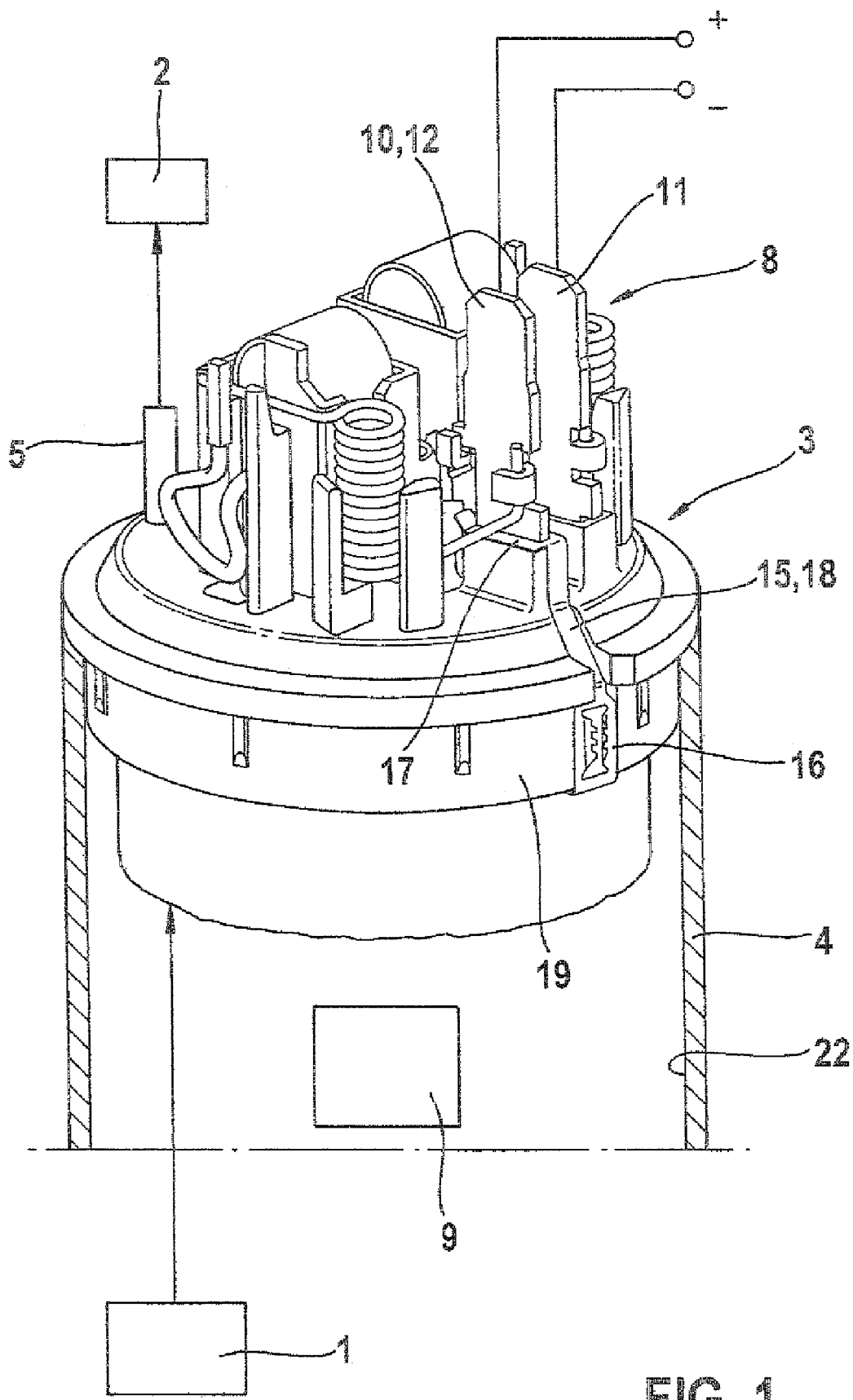
FIG. 1 in section shows a fragmentary view of a pumping assembly, shown in simplified form, having a ground connection according to the invention.

FIG. 1 in section shows a fragmentary view of a pumping assembly, shown in simplified form, having a ground connection according to the invention.

The pumping assembly serves to pump fluid, such as fuel, out of a tank 1 to a consumer 2, such as an internal combustion engine. The pumping assembly may be an arbitrary pump, such as a flow pump or a positive displacement pump.

The pumping assembly has a terminal cap 3, which is sealingly joined to a cylindrical or sleevelike pump housing 4. The pump housing 4 is also known as a pole tube. The terminal cap 3 closes the pump housing 4 on one face end.

The terminal cap 3 may be provided with a pressure stub 5 with an integrated check valve, through which the fuel, which is under pressure and is flowing through the pumping assembly, emerges.

On the terminal cap 3, a connection plug 8 is provided for making electrical contact with an armature 9 of an electric motor, the armature being disposed in the pump housing 4. The connection plug 8 has at least two terminals 10, 11, which penetrate the terminal cap 3. One of the terminals 10, 11 is connected to the electrical ground of an on-board electrical system of the motor vehicle and forms a ground terminal 12. The terminals 10, 11 are embodied for instance as plug prongs.

The pump housing 4 is connected to the ground terminal 12 via a ground connection 15, which has a first contact portion 16 for making contact with the pump housing 4 and a second contact portion 17 for making contact with the ground terminal 12. The two contact portions 16, 17 of the ground connection 15 are for instance embodied as wider than a connecting portion 18 provided between the two contact portions 16, 17. The second contact portion 17 is connected to the ground terminal 12 for instance by material engagement, positive engagement and/or nonpositive engagement. The ground connection 15 extends from the ground terminal 12 as far as a cylindrical joining portion 19 of the terminal cap 3 and rests on the outer circumference of the terminal cap oriented toward the pump housing 4. The ground connection 15 is embodied in sheet-metal and/or striplike form and is embodied as a flat ribbon which has a rectangular cross section with a width that is much larger than its thickness. Because of the flat-ribbonlike embodiment, a very low-impedance ground connection 15 is attained. The ground connection 15 is made for instance from a metal sheet.

In the installation of the pumping assembly, the terminal cap 3 is inserted on the face end into the pump housing 4, with the joining portion 19 in the lead. Between the joining portion 19 and the pump housing 4, a press fit is provided, so that the first contact portion 16 of the ground connection 15, upon insertion of the joining portion 19 into the pump housing 4, makes contact with an inside 22 of the pump housing 4 facing toward the joining portion 19.

The inside 22 of the pump housing 4, however, is provided with a surface coating, not shown, that protects against corrosion and can have electrically insulating properties. Accordingly, the surface coating can have a higher electrical resistance than the material comprising the pump housing 4.

In the prior art, as a result either no contact or only a high-impedance contact therefore occurs, which does not meet EMC (electromagnetic compatibility) requirements as well.

According to the invention, to attain a lower-impedance contact or to reduce the impedance of the contact compared to the prior art, the first contact portion 16 is embodied with sharp edges, such that when the terminal cap 3 is inserted into the pump housing 4, this first contact portion locally penetrates the electrically insulating layer embodied on the inside 22 and makes contact directly with the material comprising the pump housing 4.

The contact portion 16 is embodied as protruding in some portions toward the pump housing 4, in order to achieve the contact-making according to the invention.

Figure 2:
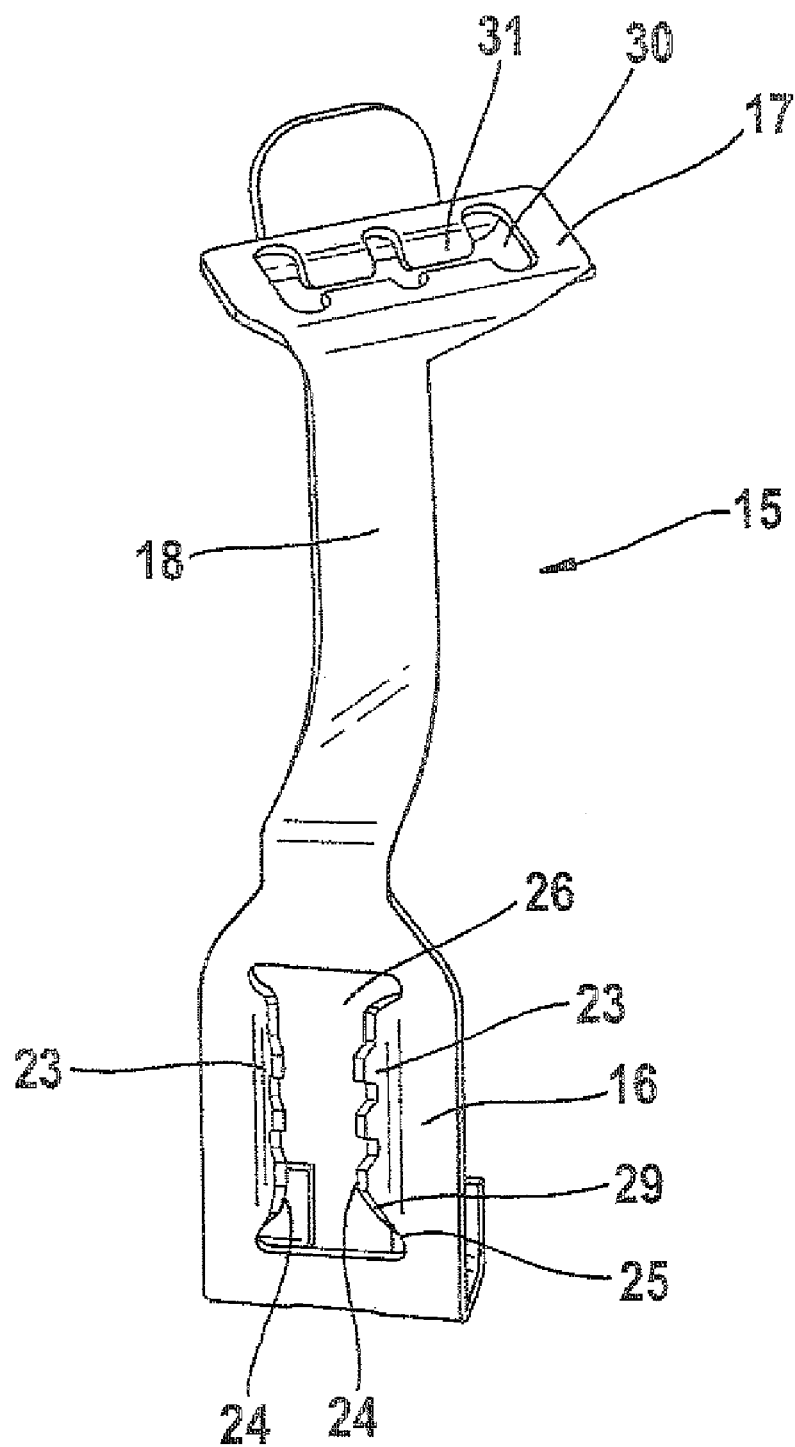
FIG. 2 is a three-dimensional view of the ground connection of the invention.

FIG. 2 is a three-dimensional view of the ground connection of FIG. 1 of the invention.

In the ground connection of FIG. 2, the parts that remain the same or function the same as in the pumping assembly of FIG. 1 are identified by the same reference numerals.

The first contact portion 16 has at least one tab 23, which is embodied as sharp-edged at least at an edge or corner 24 that is oriented toward the pump housing 4 and cooperates with it.

In one exemplary embodiment, the at least one tab 23, at the edge 24, is embodied as toothlike, sawtoothlike, wavelike, or the like. In this way, the tab 23 makes contact with the pump housing 4 at a plurality of contact points, so that the line inductance is markedly reduced because of the parallel-connected multiple contacts. Compared to the remaining first contact portion 16, the at least one tab 23 is inclined and as a result protrudes toward the pump housing 4. The inclination of the tab 23 is other than 90°, so that the tab 23 is embodied as elastically resilient and, after installation, presses with a predetermined initial tension against the pump housing 4. For example, two tabs 23 are provided, which are disposed diametrically opposite one another and extend parallel to one another. The edges 24 of the tabs 23 extend in the joining direction, that is, in the direction of the length of the pump housing 4. The tabs 23 are formed for instance by bending over a protruding rim 25 of a recess 26 of the first contact portion 16.

The first contact portion 16 is for example embodied as hooklike and engages the joining portion 19 from behind on its end toward the armature 9. In this way, the ground connection 15 is secured to its end toward the pump housing 4. However, the fixation of the ground connection 15 to the joining portion 19 may expressly also be done in some other manner by positive, material and/or nonpositive engagement, such as adhesive bonding or screwing.

On its leading edge, the at least one tab 23 for instance has a joining bevel 29 for better introduction of the ground connection 15 into the pump housing 4.

On the second contact portion 17, a recess 30 is for instance provided. The ground terminal 12 is disposed in the recess 30 and solidly connected to the second contact portion, for instance by the fact that tabs 31 are braced resiliently against the ground terminal 12.

Figure 3:
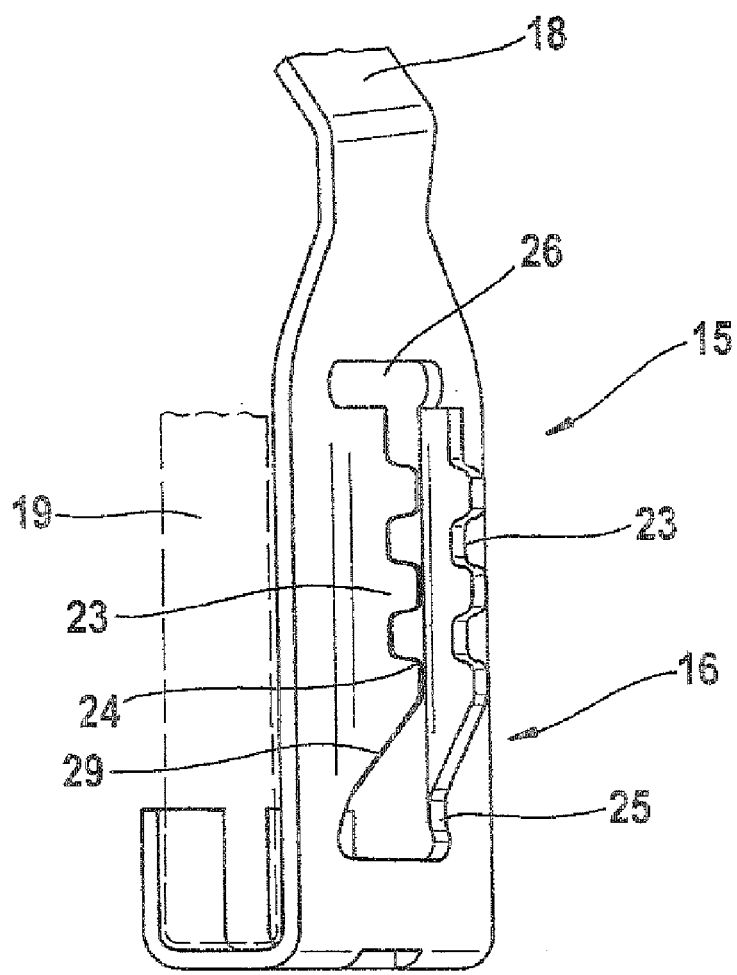
FIG. 3 is a fragmentary view of the ground connection of the invention.

FIG. 3 is a fragmentary view of the ground connection of the invention.

In the ground connection of FIG. 3, the parts that remain the same or function the same as in the pumping assembly of FIG. 1 and the ground connection of FIG. 2 are identified by the same reference numerals.

Figure 4:
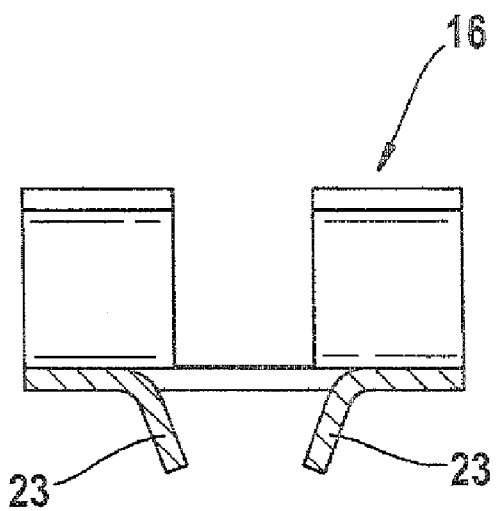
FIG. 4 is a top view on the ground connection of FIG. 3 according to the invention.

FIG. 4 is a top view on the ground connection of FIG. 3 according to the invention.

In the ground connection of FIG. 3, the parts that remain the same or function the same as in the pumping assembly of FIG. 1 and the ground connection of FIGS. 2 and 3 are identified by the same reference numerals.

The foregoing relates to the preferred exemplary embodiment of the invention, it being understood that other variants and embodiments thereof are possible within the spirit and scope of the invention, the latter being defined by the appended claims.

The invention claimed is:

1. A pumping assembly, comprising:
a pump housing;
a terminal cap;
a ground terminal provided on the terminal cap, for making contact with an electrical ground; and
a ground connection connecting the pump housing and the ground terminal of the terminal cap, the ground connection having a first contact portion for making contact with the pump housing and a second contact portion for making contact with the ground terminal, wherein
the first contact portion is embodied in sharp-edged fashion such that upon insertion into the pump housing, the first contact portion locally penetrates an electrically insulating layer embodied on the pump housing.

2. The pumping assembly as defined by claim 1, wherein the first contact portion protrudes in some portions toward the pump housing.

3. The pumping assembly as defined by claim 1, wherein the first contact portion has at least one tab, which is embodied as sharp-edged on at least one edge or corner thereof.

4. The pumping assembly as defined by claim 3, wherein the at least one tab, on an edge oriented toward the pump housing, is embodied in toothlike, sawtoothlike, wavelike or similar fashion.

5. The pumping assembly as defined by claim 3, wherein the at least one tab is inclined toward a remaining first contact portion and protrudes toward the pump housing.

6. The pumping assembly as defined by claim 3, wherein the at least one tab is foamed by bending over a protruding rim of a recess of the first contact portion.

7. The pumping assembly as defined by claim 1, wherein the first and second contact portions have a greater width than the ground connection between the first and second contact portions.

8. The pumping assembly as defined by claim 1, wherein the ground connection is embodied in striplike and/or flat-ribbonlike fashion.

9. The pumping assembly as defined by claim 1, wherein the first contact portion is embodied in hooklike fashion and engages a joining portion of the terminal cap from behind the terminal cap.

10. The pumping assembly as defined by claim 3, wherein the at least one tab has a joining bevel for introducing the ground connection into the pump housing.

* * * * *